United States Patent Office 3,148,896
Patented Sept. 15, 1964

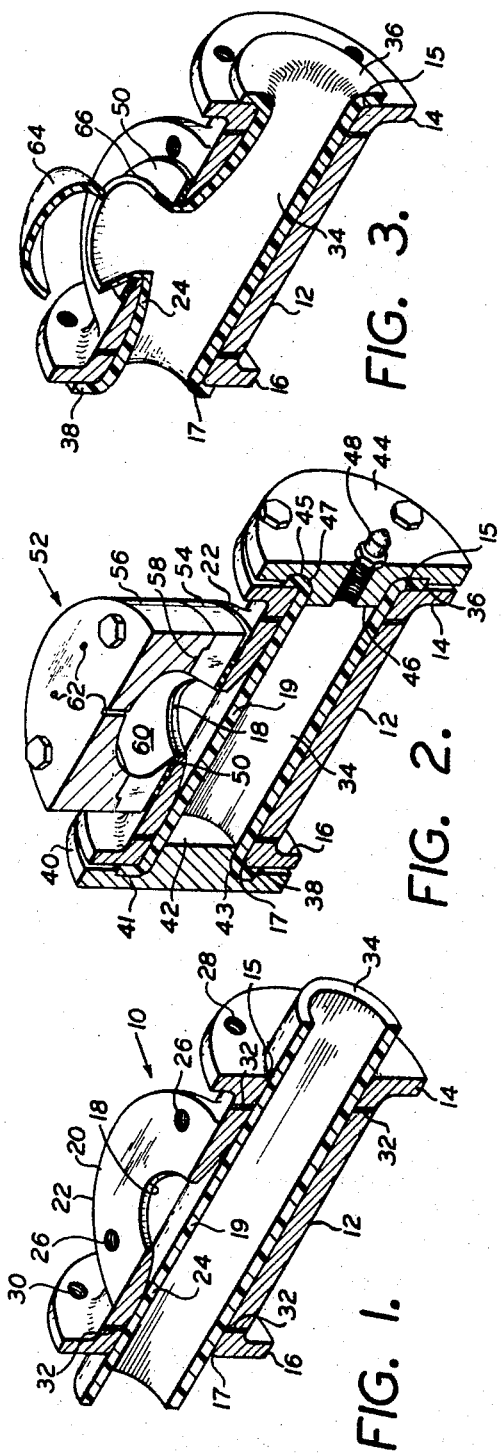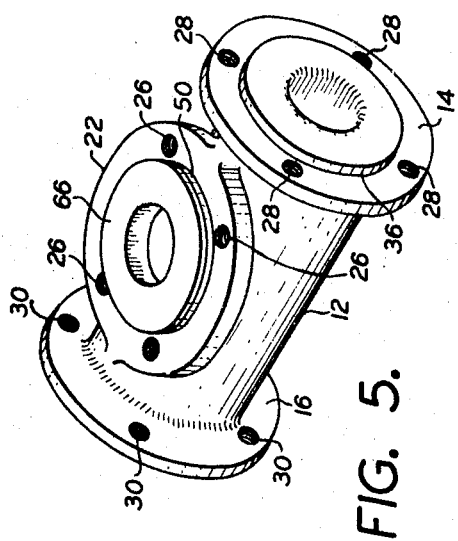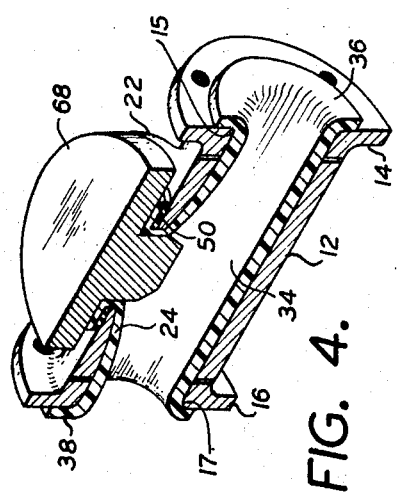

3,148,896
CORROSION PROOF PIPE FITTING
Edward J. Chu, Belleville, N.J., assignor to Resistoflex Corporation, Roseland, N.J., a corporation of New York
Filed June 30, 1959, Ser. No. 824,071
2 Claims. (Cl. 285—55)

The present invention relates to corrosion proof pipe fittings.

There is considerable need in the chemical and allied fields for piping which can handle corrosive materials, particularly over wide ranges of temperature. Not only must the piping withstand the attack of these materials, but it must be structurally sound, durable, and easy to clean.

In the copending application of Alexander N. T. St. John and William E. Titterton, Serial No. 637,159, filed January 30, 1957, now Patent No. 3,050,786, and assigned to the same assignee as the present application, there is described and claimed a method of lining a length of metal pipe with a sintered tube of polytetrafluoroethylene resin (hereinafter abbreviated P.T.F.E.). Because of the chemical inertness and other favorable characteristics of this resin, the pipe is admirably suited for satisfying the aforementioned need. It will be readily appreciated, however, that straight pipe lengths are of little value without matching fittings such as T's, crosses, offset L's, and the like.

Unlike other plastics, P.T.F.E. can not be molded or formed in the same manner or by the same techniques. Numerous attempts have been made, for example, to line a conventional flanged T fitting, all without success. Little difficulty is encountered in lining the cross head or through tubular section of the T; but known methods for handling P.T.F.E. have proven unsatisfactory for lining the lateral or branch opening or passage.

In view of the foregoing, the present invention is believed to be of considerable importance since, in accordance therewith, there is provided a corrosion proof pipe fitting comprising a metal housing having a tubular body section and at least one lateral branch opening therein intermediate the ends thereof, and a unitary piece of extruded sintered polytetrafluoroethylene resin lining the entire housing including a portion extending through said branch opening to the exterior of the fitting.

In accordance with another aspect of the present invention there is provided a method of constructing a corrosion proof pipe fitting which comprises inserting a length of extruded sintered polyetetrafluoroethylene resin tubing in the tubular body section of a metal housing having at least one lateral branch opening therein intermediate the ends thereof, heating the assembly to a temperature at which the resin can be formed, and applying blowing pressure to the interior of said tubing while still substantially at said temperature to expand a portion of the wall of said tubing outwardly through said lateral branch opening.

The invention will be better understood after reading the following detailed description with reference to the appended drawings in which:

FIG. 1 is a longitudinal section through an isometric view of a novel T fitting constructed in accordance with the present invention showing the initial step in providing a liner of P.T.F.E. therefor;

FIGS. 2 to 4 are similar views showing subsequent successive steps in the processing, and FIG. 5 is a full isometric view of the finished lined T.

For convenience the present invention is described herein in terms of the construction and fabrication of a lined T. It will be understood, however, that the underlying principles are equally applicable to the production of any fitting wherein a tubular section is intersected by a branch opening.

Referring now to FIG. 1, it has been found necessary, due to limitations in the moldability of P.T.F.E., to start with a metal housing 10 of novel construction. As shown, the housing 10 has a cross head or tubular body section 12 and end flanges 14 and 16 as in conventional T fittings; however, the branch opening 18 in the wall of the section 12 has substantially no length with the face 20 of the bolt flange 22 lying in a plane tangent to the exterior surface of the section 12. In order to further reduce the length of the lateral opening or passage, the interior surface of the section 12 follows a gradual transitional curve 24 adjacent the opening 18 to reduce the wall thickness in the vicinity thereof. Because of the nature of the fitting, the bolt holes 26 in the flange 22 are tapped, there being no space or clearance below the flange for the reception of a nut. The bolt holes 28 and 30 in the flanges 14 and 16, however, may be either smooth or tapped as desired. For reasons that will be more readily apparent after reading the following discussion, the edges of the openings in the cross head are rounded or radiused at 15 and 17. The fitting 10 is also provided with a plurality of small vent holes 32, as shown. These holes prevent entrapment of air during the forming process which would cause separation between the liner and the housing, and they also prevent any implosion during use of the fitting due to the accidental inclusion of any moisture or organic matter between the liner and the housing.

After thoroughly degreasing the housing to further minimize the risk of implosion, a sintered tube 34 of P.T.F.E. is inserted in the section 12 of the housing 10, as shown. The liner is preferably prepared by the process known as paste extrusion. For optimum results the liner should have been quenched after the sintering thereof. A wall thickness of about ¼ inch is suitable for the liner in all fitting sizes, although a slightly thinner tube may be preferred in the smaller sizes. i.e., 1 inch or less. The tube 34 should make a slip fit with the housing with a clearance between a few thousandths and approximately ¹⁄₃₂ inch for best results.

Attention should now be directed to FIG. 2. With the tubing 34 in the section 12 of the metal housing, the tubing ends are flared outwardly at 36 and 38 over the radiused edges 15 and 17 to overlie the faces of the flanges 14 and 16. Flaring is performed by the application of a heated flaring tool in known manner. After the tubing ends are flared, a blind flange plate 40 having a pilot section 42 is secured to one end of the tubing, for example to the flange 16. To the opposite flange 14 is secured a flange plate 44 having a pilot 46 and a fitting 48 installed therein for enabling air under pressure to be admitted to the interior of the tube 34. The flange plates 40 and 44 are each provided with an annular recess, 41 and 45 respectively, adjoining the corresponding pilots, the included angle being filleted at 43 and 47. The depths of the recesses should be less than the thickness of the flared ends 36 and 38 of the tubing 34. One relationship that has been found satisfactory involves a recess depth of 0.150" for use with a 0.250" thick tube having a flare thickness of about 0.200". This provides a clearance between the respective flange plate and end flange of the housing 12 of about 0.050" before tightening and somewhat less, about 0.040", after tightening of the flange plate.

The reason for the aforementioned construction of the flange plate follows from the fact that it has been found necessary to maintain a positive pressure, as uniform as possible, on the ends of the tube 34 from the periphery of the flared portions to a point a short distance inside of the ends of the housing. It has been found that any deviation in the clamping pressure on a particular spot will result in localized flow of the plastic when the assembly is heated during the subsequent processing which, in turn, causes the development of fissures or cracks. The appropriate proportioning of the annular recesses 41 and 45 insures against any appreciable radially outward flow of the material in the flared portions 36 and 38 through the gaps between the flange plates and the corresponding end flanges of the housing.

To insure uniform pressure in the region of the radius or bend, the radius of each fillet 43 and 47, should be made equal to the sum of the thickness of the wall of the tube 34 and the radius of the corresponding curved edge 15 or 17. The pilot can be made smaller than the inside of the housing by an amount equal to the thickness of the liner to provide a slip fit within the tube 34, relying upon the unequal coefficients of thermal expansion between the plastic and the metal parts to develop the required pressure, when the assembly is heated. Next a gasket 50 of compressed asbestos or similar material able to withstand temperatures in excess of 600° F. is placed on the face of the flange 22. A removable hollow mold designated generally 52 is bolted or otherwise secured to the flange 22 over the opening 18 on top of the gasket 50. As shown, the mold consists of 3 basic parts. Two of the parts are in the form of a split ring of which one part is shown at 54, while the third part is in the form of a cover plate 56. The cover plate 56 is provided with a recess 58 for receiving the raised portions on the split rings.

The presently preferred configuration for the cavity 60 of the mold is substantially as shown in the drawing. It is believed that the advantages of this shape will be apparent from the subsequent discussion. It is recognized that the shape may be varied depending upon the results desired. With the illustrated shape, however, it has been found possible to obtain the maximum amount of material at that portion of the liner which ultimately overlies the flange 22. Also, as shown, the cover plate 56 is provided with a series of vent holes 62 for permitting entrapped air to escape from the interior of the mold during the forming process.

After completion of the assembly, the entire unit is placed into a hot air oven maintained at a temperature close to, but slightly below the corresponding temperature range set forth hereinafter, e.g., 600° F. The unit is left in the oven until the flange plates 40 and 44, as well as the tubing at the central location 19, has stabilized at the oven temperature. With a three inch T it has been found from experience that this can be expected to occur after about four hours.

The oven control is now adjusted to establish a temperature slightly above the corresponding range set forth below in Table I, and the assembly is permitted to remain in the oven until the central location 19 has reached the appropriate forming temperature found from Table I. The length of time will depend upon the housing and lining and various other parameters and must be ascertained by trial and error.

*Table I*

| Nominal fitting size: | Range of forming temperatures |
|---|---|
| 1″ | 614° F.–619° F. |
| 1½″ | 614° F.–619° F. |
| 3″ | 614° F.–619° F. |
| 4″ | 610° F.–619° F. |
| 6″ | 600° F.–619° F. |

It is preferred to employ the higher temperatures although satisfactory results have been obtained over the entire range.

When the unit has reached the required temperature it is removed from the oven and an air line is quickly connected to the fitting 48. Air under pressure of approximately 200 p.s.i. is admitted then to the interior of the tubing 34 causing a portion thereof to be blown or formed up into the cavity of the mold 52. As soon as full pressure is introduced, the entire unit is submerged in a container of water for quenching. Then the pressure is relieved and the unit disassembled by removing the mold 52 and the flanges 40 and 44.

The resulting product is substantially as shown in FIG. 3 except that the crown 64 is still integral with the skirt portion 66 of the lining. FIG. 3 diagrammatically illustrates the manner in which the crown 64 should be carefully severed or cut from the expanded portion of the liner 34. It will also be observed from this figure that the wall thickness of the liner is reduced in the region where it overlies the transitional curve 24 and in the skirt 66.

As shown in FIG. 4, a flaring tool 68 is clamped to the flange 22 after having been heated to approximately 600° F. With the hot tool 68 in place, the assembly may be either water quenched for expediency or allowed to air cool. When cool the tool 68 is removed, and all of the flared portions of the lining can be accurately trimmed to shape and size. The finished fitting will appear as shown in FIG. 5.

From the foregoing it should be apparent that the skirt 66 of the P.T.F.E. lining overlies the fiber gasket 50 on the flange 22. The total "gasket" thickness including the fiber gasket 50 and the skirt 66 should be made sufficient to accomplish the usual functions of a gasket seal. The fiber gasket 50 is needed to compensate for the initial cold flow of P.T.F.E. under compression and it can be omitted where the P.T.F.E. has sufficient thickness by itself. Generally the fiber gasket can be omitted when the P.T.F.E. skirt exceeds .150 inch in thickness.

It should now be evident that the "bell" shape of the mold cavity facilitates subsequent flaring of the skirt 66. The novel construction of the housing minimizes the extent to which the tubing 34 must be expanded. It has been found with P.T.F.E. that the material thins considerably during this type of processing. With the construction as shown, the skirt 66 will have a thickness of about .060 inch when the starting thickness is ¼ inch. It is thus evident that much greater expansion would lead to a number of difficulties.

It was mentioned above that it had been found necessary to maintain uniform pressure over the entire region of the liner clamped between the flange plates 40 and 44 and the respective ends of the housing 12 during the forming steps. This is due to the fact that because of the proximity of the ends of the housing to the midsection in which the forming takes place, it is generally not feasible to maintain the ends of the tube 34 at a temperature sufficiently below that at the midsection to prevent loss of the end seals or damage to the ends of the liner. However, where the shape or construction of the housing permits, the seals at the ends of the liner may be maintained by keeping the end flanges or flange plates cooler than the intermediate section of the "mold" in the manner described more fully and claimed in the co-pending application of William E. Titterton and Frank Kamp, Serial No. 637,158, filed January 30, 1957, now Patent No. 2,983,961, and assigned to the same assignee as the present application.

In using the term "uniform pressure" above, it should be understood that the clamping pressure on the flared portion of the liner will be greater than the pressure in the region of the flange plate pilots, but that there will prevail a gradual and uniform transition or pressure gradient over the clamping region.

The invention has thus been described in detail with reference to the preferred embodiment thereof, but it is to be understood that various changes or modifications may be made therein as will appear to those skilled in the art without departing from the true spirit of the invention as defined in the appended claims.

What is claimed is:

1. A corrosion proof pipe fitting comprising a metal housing having a tubular body section and at least one lateral branch opening therein intermediate the ends thereof terminating in a flange, the face of said flange lying in a plane substantially tangent to the exterior surface of said tubular body section, the interior surface of said body section following a gradual transitional curve adjacent said lateral opening to reduce the wall thickness of the housing in the vicinity of said opening, and a unitary seamless piece of extruded sintered polytetrafluoroethylene resin lining the entire housing including a portion extending over said curve and through said branch opening to the exterior of the fitting where it is flared outwardly over said flange face to provide a gasket therefor.

2. A corrosion proof pipe fitting comprising a metal housing having a tubular body section terminating in first and second flanges at opposite ends and having at least one lateral branch opening therein intermediate the ends thereof terminating in a third flange, a fiber gasket disposed on said third flange, and a unitary piece of extruded sintered polytetrafluoroethylene resin lining the entire housing, said resin extending beyond the body section of said housing where it is flared outwardly over said first and second flanges and including a portion extending through said branch opening to the exterior of the fitting where it is flared outwardly over said gasket on the third flange.

References Cited in the file of this patent

UNITED STATES PATENTS

| | | |
|---|---|---|
| 2,343,440 | Andrus | Mar. 7, 1944 |
| 2,607,078 | Grimes | Aug. 19, 1952 |
| 2,608,501 | Kimble | Aug. 26, 1952 |
| 2,613,958 | Richardson | Oct. 14, 1952 |
| 2,724,672 | Rubin | Nov. 22, 1955 |
| 2,789,934 | Bushbach | Apr. 23, 1957 |
| 2,880,018 | Robinson | Mar. 31, 1959 |
| 2,907,103 | Lewis et al. | Oct. 6, 1959 |

FOREIGN PATENTS

| | | |
|---|---|---|
| 731,896 | Great Britain | June 15, 1955 |
| 749,497 | Great Britain | May 23, 1956 |